United States Patent
Wey et al.

(10) Patent No.: US 11,732,966 B2
(45) Date of Patent: Aug. 22, 2023

(54) METHOD FOR PREPARING A MOLTEN MEDIUM AND INSULATING BODY

(71) Applicant: Robatech AG, Muri (CH)

(72) Inventors: Marcel Wey, Sarmenstorf (CH); Urs Mösli, Winterthur (CH)

(73) Assignee: ROBATECH AG, Muri (CH)

( * ) Notice: Subject to any disclaimer, the term of this patent is extended or adjusted under 35 U.S.C. 154(b) by 46 days.

(21) Appl. No.: 17/503,968

(22) Filed: Oct. 18, 2021

(65) Prior Publication Data

US 2022/0128306 A1    Apr. 28, 2022

(30) Foreign Application Priority Data

Oct. 26, 2020  (EP) .................................... 20203929

(51) Int. Cl.
    *B29B 13/02*  (2006.01)
    *F27D 5/00*   (2006.01)
    *B32B 37/12*  (2006.01)

(52) U.S. Cl.
    CPC ........ *F27D 5/0068* (2013.01); *B32B 37/1207* (2013.01); *F27D 2005/0075* (2013.01)

(58) Field of Classification Search
    CPC ........ B05C 9/14; B05C 11/1047; B65D 53/02
    See application file for complete search history.

(56) References Cited

U.S. PATENT DOCUMENTS

| | | | |
|---|---|---|---|
| 4,456,151 A * | 6/1984 | Lewellen | B29B 13/022 222/173 |
| 4,485,941 A * | 12/1984 | Frates | B05C 11/1042 222/189.11 |
| 4,666,066 A * | 5/1987 | Boccagno | B29B 13/022 219/421 |
| 4,821,922 A | 4/1989 | Miller | |
| 5,755,351 A * | 5/1998 | Kruzick | B65F 1/1615 220/326 |
| 5,919,384 A * | 7/1999 | Reifenberger | B29B 13/022 219/424 |
| 5,927,555 A * | 7/1999 | Harben | B05C 11/1042 222/410 |
| 8,939,318 B2 * | 1/2015 | Ganzer | B29B 13/022 220/345.6 |
| 2014/0144523 A1 | 5/2014 | Ganzer | |

FOREIGN PATENT DOCUMENTS

| | | |
|---|---|---|
| EP | 0 075 428 A1 | 3/1983 |
| EP | 0 362 802 A2 | 4/1990 |

OTHER PUBLICATIONS

Europäisches Patentamt (European Patent Office), Europäischer Recherchenbericht (European Search Report), dated Apr. 15, 2021, 2 pages, European Patent Office, München, Germany (DE).

* cited by examiner

*Primary Examiner* — Gregory A Wilson
(74) *Attorney, Agent, or Firm* — Christopher C. Dremann, P.C.; Christopher C. Dremann

(57) ABSTRACT

A melter for preparing a molten medium, in particular for preparing a molten adhesive, has a housing and a melting tank formed within the housing. The melter further has a filling opening for introducing the medium to be melted. The melter further has a wall section which encircles the filling opening. The melter further has an insulating body which encircles the filling opening and covers the wall section. The insulating body is elastically deformable for use in such a melter.

19 Claims, 6 Drawing Sheets

METHOD FOR PREPARING A MOLTEN MEDIUM AND INSULATING BODY

FIELD OF THE INVENTION

The present invention relates to a melter for preparing a molten medium, in particular for preparing a molten adhesive. The invention furthermore relates to an insulating body for use in such a melter.

BACKGROUND OF THE INVENTION AND RELATED ART

In a wide variety of industries, hot-melt adhesives are used to connect parts to one another. Before processing, adhesives of this type must be converted from the solid state to a liquid or pasty state by the action of heat. This is accomplished by melters.

It is quite possible for the melter according to the invention to be part of another device.

It is also quite possible for the melter according to the invention to have further components, such as, for example, a pump for delivering the molten medium/adhesive. Furthermore, the melter can also have a distributor for discharging molten adhesive into at least one line which can be connected to the distributor.

The medium to be melted can be present, for example, in the form of granules, pellets, blocks or sticks.

Melters for preparing a molten medium, in particular melters for preparing a molten adhesive, typically have a housing and a melting tank formed within the housing. The melting tank is used to melt the medium to be melted, wherein the melting tank can generally be heated by means of an electric heater. In order to feed the medium to be melted to the melter, namely to the melting tank, the melter has a filling opening. Via this filling opening, the medium is fed in solid form to the melting tank. This can be done manually.

When medium to be melted, in particular granular medium, is supplied during operation of the melter, there is the problem that the region of the device which surrounds or is adjacent to the filling opening has an increased temperature. The temperature is typically in the range of the temperature of the liquid medium or slightly below it. Depending on the melting temperature of the medium to be melted, the region surrounding the filling opening can have temperatures in the range from 60° C. to 200° C. Depending on the medium to be melted, the adjacent region may also quite possibly have higher temperatures. As a result, there is an acute risk of burns for the operating personnel. To avoid burns, protective equipment must typically be worn when manually filling the melter. Especially when handling relatively small amounts of adhesive to be melted, wearing protective equipment is particularly obstructive.

Particularly when wearing protective equipment, there is the problem that some of the solid medium, for example adhesive, may not be fed directly through the filling opening into the interior of the melting tank; instead, some of the medium to be melted may get into regions of the melter that are adjacent to the filling opening. For example, the media to be melted which are fed in may get onto a hot edge region of the melting tank and, owing to the elevated temperature in this region, may be at least partially melted. Usually, the edge of the melting tank and the bearing surface of a cover which serves to close the opening are made of metallic materials or hard, temperature-stable plastics. For tolerance reasons and because of the material pairing, it is not possible in this way to close the tank in an airtight manner. The melting of the portions of the medium to be melted which get into the edge region, is problematic to the extent that this portion of the medium typically does not get into the interior of the melting tank and is thus not processed further. During operation of the melter, the medium which does not get into the region of the melting tank undergoes aging, which is accompanied by a change in the properties. Particularly in the case of adhesives, there is the problem that it is particularly difficult to remove this aged adhesive and to clean it off the melter. Particularly in the case of a relatively long operating time, this adhesive burns slowly and discolors. Burns occur on the adhesive and it becomes dark to black and typically cures. As a result, the edge region of the melter surrounding the opening is contaminated by aged adhesive, as a result of which, upon detachment of this aged adhesive and penetration of this aged adhesive into the interior of the melting tank, unwanted contamination of the molten medium or adhesive occurs, which can lead to damage, in particular to application heads supplied with molten medium. Misdirected media which penetrate into corners, edges and/or depressions of the melter, in particular those which are located adjacent to the filling opening of the melter, are particularly problematic.

The contaminants in the edge region of the filling opening are particularly problematic if the melter has a cover for closing the filling opening since, owing to deposited material, i.e. media which do not reach the melting tank, the sealing effect of the cover may be impaired, as a result of which the thermal insulation effect of the cover may be impaired, and, in addition, there is the risk that harmful gases will get into the surroundings of the melter in relatively large amounts. Such gases can arise, for example, during melting of the medium to be melted.

A poor sealing effect of the cover is also problematic to the extent that ambient air can get into the region of the melting tank, which can lead to the hot adhesive melted in the melting tank burning or oxidizing and aging. In the case of reactive adhesives, such as, for example, polyurethane (PUR) adhesives, unwanted curing of the adhesive in the melting tank can occur as a result of the influence of atmospheric moisture.

EP 0 075 428 A1 discloses a device for melting solid thermoplastic material and for supplying a delivery device with molten thermoplastic material. This device comprises a storage container or melting tank which has a bottom, side walls rising from the bottom and is open at the top, and further contains electrical resistance heating means, which are fastened within the bottom. The device further comprises a cover arranged over the open end of the storage container for closing the opening.

OBJECT OF THE INVENTION

It is the object of the present invention to provide a melter which overcomes the abovementioned disadvantages.

This object is achieved by means of a melter which has the features of the present invention, as described herein and illustrated by the drawing figures. The object is furthermore achieved by means of an insulating body which has the features of the present invention, as described herein and illustrated by the drawing figures.

SUMMARY OF THE INVENTION

The melter of the present invention is used to prepare a molten medium, in particular to prepare a molten adhesive.

The melter has a housing and a melting tank formed within the housing, wherein the melter has a filling opening for introducing the medium to be melted. Furthermore, the melter has a wall section which encircles the filling opening, wherein the melter has an insulating body which encircles the filling opening and covers the wall section. The insulating body is elastically deformable.

Owing to the fact that the insulating body is elastically deformable, it can be installed or fitted particularly easily, in particular without tools.

Since the insulating body encircles the filling opening, the filling opening is not closed by the insulating body; on the contrary, only the wall section which encircles the filling opening is covered. Since this wall section has an increased temperature during operation of the melter, the risk that the operating personnel will burn themselves on the hot surfaces of the wall section is significantly reduced by the covering of the edge region by means of the insulating body. Furthermore, a situation where, as the medium is fed in, it comes into contact with the hot wall section and melts there and possibly sticks is avoided. As a result of the covering insulating body, direct contact between the medium to be melted and the wall section is avoided. Since the insulating body has a lower temperature on its surface facing away from the wall section owing to the insulating effect, melting of medium during the contacting of the insulating body is avoided or at least reduced.

The material of the insulating body preferably has a thermal conductivity of 0.1 to 0.5 W m$^{-1}$ K$^{-}$1 under normal conditions.

Since the insulating body is elastically deformable, a particularly good sealing effect is ensured when a cover that closes the filling opening is used, even when there are production tolerances, in particular high production tolerances. As a result, heat loss is reduced, emissions of adhesive vapors are avoided, and the aging of the medium in the form of oxidation of adhesive and curing of reactive adhesives are minimized by avoiding the introduction of ambient air, in particular water vapor.

Owing to the fact that the insulating body is elastically deformable, it can be installed in the melter in a particularly simple manner, in particular without tools. In the event of very severe damage or contamination or other wear, the insulating body can be replaced in a particularly simple manner.

The insulating body is preferably held in a clamping manner in the melter, in particular in a clamping manner on the wall section.

The elasticity of the insulating body is also to be regarded as advantageous inasmuch as cured adhesive or cured medium can be removed therefrom in a particularly simple manner. Since the cured media, in particular cured adhesive, is generally brittle, the adhesion of the cured medium to the insulating body can be broken in a particularly simple manner by deforming the insulating body. In particular, it is envisaged that, for the purpose of removing cured media from the insulating body, the insulating body is separated from the melting device and then deformed. In the case of an insulating body removed from the melter, it is a particularly simple matter to deform the insulating body by a particularly large amount.

It is quite conceivable that the melting tank is a premelting tank. It is quite conceivable for the melting tank to be adjoined by a storage region for the molten medium.

It is quite possible for the melter to be part of another device, for example a dispensing unit for dispensing adhesive.

It is also quite conceivable for the melter to comprise further components, such as, for example, a feed pump, a distributor for the molten medium, to which lines can be connected, and/or control electronics.

It is regarded as particularly advantageous if the melting tank can be heated by means of an electric heating device.

Since the insulating body is elastically deformable, the insulating body is particularly resistant to mechanical external influences. In contrast to the use of hard, temperature-stable plastics, e.g. thermosets, as insulating material, there is a significantly lower risk of breakage when an elastically deformable insulating body is used.

It is regarded as particularly advantageous if the insulating body has a smooth surface on its outside, in particular if the outwardly facing surface is free or substantially free of depressions and/or undercuts. This makes it particularly easy to clean the insulating body. In addition, components of the medium to be melted, in particular granules, and splashes of the molten medium are prevented from settling in depressions or corners. In this context, it is also regarded as advantageous if edges of the outside or edges of the outwardly facing surface are rounded.

The wall section and the insulating body each preferably have an opening. A partial region of the insulating body having the opening preferably extends into the opening of the wall section. The configuration of the opening of the wall section and the configuration of the opening of the insulating body, as well as the arrangement of the openings of the wall section and of the insulating body with respect to one another, may quite possibly determine the shape of the filling opening. Thus, the shape of the filling opening may be determined exclusively by the shape of the opening of the insulating body, for example, e.g. when the insulating body completely fills the opening of the wall section, in particular in such a way that the opening of the insulating body is formed within the opening of the wall section.

Preferably, the insulating body has a continuous surface which has an opening only to form the filling opening.

It is regarded as particularly advantageous if the insulating body comprises an elastomer, preferably consisting of an elastomer.

As a particular preference, the insulating body comprises a silicone rubber or a silicone elastomer. In a particularly preferred embodiment, the insulating body consists of silicone rubber or a silicone elastomer.

As a result of the lower surface temperature of the insulating body, in particular of the insulating body designed as an elastomer molding, the medium which comes into contact with the insulating body, in particular the adhesive which comes into contact with the insulating body, is melted less quickly and oxidizes or burns less quickly on account of the lower temperature.

It is regarded as particularly advantageous if the insulating body makes direct and flat contact with the wall section, at least in a region facing the inlet opening. A situation where medium gets into the regions between the wall section and the insulating body is thereby avoided. In addition, penetration of medium into the intermediate region between the wall section and the insulating body can lead to undesired strong adhesion of the insulating body to the wall section, thereby impairing simple detachment of the insulating body from the wall section.

It is regarded as particularly advantageous if, when arranged in the melter, the insulating body is stretched relative to a basic state of the insulating body. Here, the basic state corresponds to the state of the insulating body before it is arranged in the melter, thus to a state without the action of external forces. This promotes particularly close contact and good retention of the insulating body.

It is regarded as particularly advantageous if the insulating body interacts non-positively (e.g. friction fit; interference fit) and/or positively (e.g. locking; interlocking) with the housing and/or the wall section. Preferably, the insulating body interacts directly with the housing and/or the wall section. Thus, it is not necessary to provide separate fastening means, such as screws, clamps, snap fasteners or the like. On the one hand, such additional fastening means increase the effort involved in releasing or connecting the insulating body from or to the melter. Furthermore, such additional fastening means form edges, depressions or other structures on which the medium to be melted could settle and from which it would be difficult to remove it.

The holding structure and the counter-structure preferably interact positively. In particular, provision is made for the holding structure and/or the counter-structure to be designed in the manner of an undercut. It is also quite conceivable for the holding structure and the counter-structure to be designed in the manner of a tongue-and-groove connection.

The material of the wall section is, in particular, a plastic. The wall section preferably has a main body made of glass-fiber-reinforced plastic, in particular a main body made of glass-fiber-reinforced polyphenylene sulfide (PPS).

The wall section is preferably an injection-molded part.

In particular, the wall section has a main body made of metal or of a metal alloy. The main body is preferably a casting.

However, it is also quite conceivable for the wall section to have sheet-metal parts, in particular to be formed from sheet-metal parts.

It is quite conceivable that the wall section is a part of the melting tank, in particular a part of a wall of the melting tank.

It is regarded as particularly advantageous if the wall section is formed by a separate component, thus not being a part of the melting tank.

In a preferred embodiment, the insulating body is placed over the wall section, in particular an edge region of the wall section.

In a preferred embodiment, the insulating body is of one-piece design.

It is regarded as advantageous if the insulating body covers an end of the wall section which is remote from the melting tank, in particular if the insulating body accommodates that end of the wall section which is remote from the melting tank. For this purpose, it is quite conceivable for the insulating body to have a groove, in particular a circumferential groove, on a side facing the wall section.

It is regarded as particularly advantageous if the insulating body covers the wall section in the filling direction of the medium. The filling direction is defined, in particular, by an axis defined by the geometry of the filling opening and the position of the melting tank, for example by an axis of symmetry, wherein the filling direction runs along the axis of symmetry in the direction of the melting tank. In the case of a circular opening, the filling direction runs through the center and perpendicularly to a plane defined by the circle, for example. In the case of covering in the filling direction, particularly good covering of the wall section is achieved.

It is regarded as advantageous if the insulating body at least partially, preferably completely, covers, in particular makes contact with, the wall section on an outer side of the wall section. In the present case, the outer side is understood to mean that side of the wall section which faces away from the filling opening.

It is regarded as particularly advantageous if the insulating body at least partially, preferably completely, covers, in particular makes contact with, the wall section on an inner side of the wall section. In the present case, the inner side is understood to mean that side of the wall section which faces the filling opening.

The wall section and/or the insulating body are/is preferably inclined, at least in some section or sections, with respect to a plane formed by a standing surface of the melter. Thus, it is quite conceivable for the wall section and/or a partial region of the insulating body to be designed in the manner of a parallelepiped.

It is regarded as particularly advantageous if the wall section and/or the insulating body are/is of funnel-shaped design or has at least one region of funnel-shaped design. This makes it easier to introduce medium into the melting tank through the filling opening.

In order to avoid contamination of regions of the melter which are adjacent to the filling opening, it is regarded as advantageous if the insulating body has a covering section, wherein the covering section covers a region of the melter which is adjacent to the wall section, in particular covering it in the filling direction, in particular making direct contact with this region.

In this context, it is regarded as particularly advantageous if the insulating body extends into opposite edge regions of the melter, in particular as far as opposite housing sections of the housing.

In order to achieve particularly good thermal insulation and in order to avoid the penetration of foreign bodies into the melting tank and the penetration of ambient air into the region of the melting tank and/or the escape of gases from the melting tank into the environment, it is regarded as advantageous if the melter has a cover for closing the filling opening. The cover is preferably mounted in the housing. It is regarded as particularly advantageous if the cover is mounted pivotably in the housing. It is also quite conceivable for the cover to be part of the housing.

The cover and the insulating body each preferably have a sealing surface, wherein the sealing surface of the cover and the sealing surface of the insulating body make contact with one another in an arrangement of the cover in which it closes the filling opening.

However, it is also quite conceivable for a sealing lip to be molded onto an edge region of the wall section. Furthermore, it is also quite conceivable for the insulating body or the wall section to have a circumferential groove, wherein a sealing lip is arranged in this groove.

The cover can preferably be handled independently of the insulating body.

In a particularly preferred embodiment, provision is made for the insulating body to have a sealing lip. The sealing lip preferably projects in the direction of the cover and/or counter to the filling direction. Preferably, the sealing lip encircles the filling opening.

It is furthermore regarded as advantageous if the cover has a main body and a sealing body which is resiliently mounted and/or movably mounted and/or elastically deformable in the main body, wherein the sealing body forms the sealing surface. It is quite possible for the sealing surface as such to be of rigid design. In particular, it is quite possible for the sealing surface of an elastically deformable sealing body to be of rigid design. It is quite possible for the sealing body to be designed as a plate, in particular as a hard plate. The plate as such can be produced from a hard plastic, a metal or a metal alloy, for example. The plate is preferably resiliently mounted in the main body by means of elastically deformable springs, e.g. by means of spiral springs. Resilient mounting can alternatively or additionally be accomplished by means of an elastically deformable material, for example in the form of an elastically deformable intermediate piece between the main body and the sealing body. A silicone foam or the like is particularly suitable as the elastically deformable material. The material is preferably a thermally insulating material. In such an embodiment having a resiliently mounted sealing body and/or movably mounted and/or elastically deformable sealing body, a particularly good sealing effect is achieved. As a result, heat loss is reduced, emissions of vapors formed during melting are avoided, and aging in the form of oxidation and curing are minimized by avoiding the introduction of ambient air.

In connection with a cover, it is considered expedient if the weight of the cover is selected in such a way that the cover presses with sufficient force on the insulating body, in particular a sealing lip of the insulating body, by its own weight. As a result, it is possible to dispense with additional locking means.

It is regarded as particularly advantageous if the insulating body and the wall section and/or the insulating body and the housing and/or the insulating body and the cover contrast in color. This configuration makes it easy for an operator to determine whether the melter is equipped with an insulating body. Furthermore, the color contrast makes it easy to identify where the filling opening of the melter is located. This makes it easier for an operator, in particular an untrained operator, to handle the melter, in particular to fill the melting tank. The color contrast can, for example, be such that the housing is designed to be white and the insulating body is designed to be black. However, it is also quite conceivable for the insulating body to be designed to be brightly colored, and thus not black, white or transparent, but, for example, red, green or blue, and for the housing to be designed to be white. The insulating body is preferably designed to be light green, in particular Pantone 376 C.

It is regarded as particularly advantageous if the insulating body is visible from the outside when the cover is closed. This makes it easy to determine whether the melter is equipped with an insulating body, even when the cover is closed. This prevents the melter from being unintentionally put into operation and/or the cover from being opened, e.g. when the insulating body is removed for the purpose of cleaning the insulating body. Furthermore, if this device has nevertheless been put into operation, it becomes apparent to the operating personnel that the corresponding device is not equipped with an insulating body, as a result of which burns caused by handling of the device during operation are avoided.

The insulating body is preferably designed to be of single color at least adjacent to the filling opening, the entire insulating body preferably being of a single color. In particular, the insulating body is designed to be black or to be colorful, for example to be green, in particular to be Pantone 376 C. In the case of a single-color configuration, contaminants adhering to the insulating body, for example burnt adhesive, can be detected particularly easily. The use of an elastomer, in particular a silicone or silicone elastomer, is also regarded as advantageous in connection with color configuration of the insulating body since elastomers can be colored in a particularly effective and simple manner.

It is also quite possible for coloring and/or shaping of the insulating body and/or coloring of the housing to serve as an identifying feature for a specific product or for a specific supplier.

Furthermore, an optically appealing configuration can be achieved in a simple manner by the coloring of the insulating body.

Preferably, the housing and/or the cover have recessed grips for handling the cover. It is regarded as particularly advantageous if the insulating body extends into the region of the recessed grips. As a result, on the one hand, the recessed grip is thermally insulated in a particularly effective manner from the hot melting tank or the hot wall section, and, on the other hand, the insulating body is particularly well visible from the outside in the case of a design with recessed grips.

The visible surfaces of the insulating body are preferably designed as smooth surfaces. Preferably, the insulating body has a smooth upper side. On its underside, the insulating body preferably has supporting structures to increase dimensional stability. These supporting structures are webs, for example. Good deformability is thereby achieved with, nevertheless, sufficient dimensional stability. It is regarded as particularly advantageous if the insulating body has free spaces, for example in the form of recesses or troughs, on its underside. This saves material and, in addition, achieves particularly good insulation of those components of the melter against which the underside of the insulating body rests.

The hardness of the material used for the insulating body is preferably between 40 Shore A and 90 Shore A, particularly preferably between 50 Shore A and 80 Shore A.

The medium to be melted can also be introduced or fed in by means of a conveying device, for example a pneumatic conveying device.

It is quite possible for the melter to have a connection for connecting a feed line for the medium to be melted. The connection can be formed in the region of the cover, for example. Such connections or feed lines can be used particularly in the case of granular media. Such a feed line can be or can have been connected to a conveying device, for example.

The insulating body according to the invention serves, in particular, for use as an insulating body in any of the abovementioned embodiments of the melter. The embodiments of the insulating body which are disclosed in connection with the melter apply correspondingly to the insulating body as such.

BRIEF DESCRIPTION OF THE DRAWING FIGURES

The present invention is explained in greater detail by means of exemplary embodiments shown in the accompanying drawing figures, without being restricted thereto.

DETAILED DESCRIPTION OF EXEMPLARY EMBODIMENTS OF THE INVENTION

Figure 1:
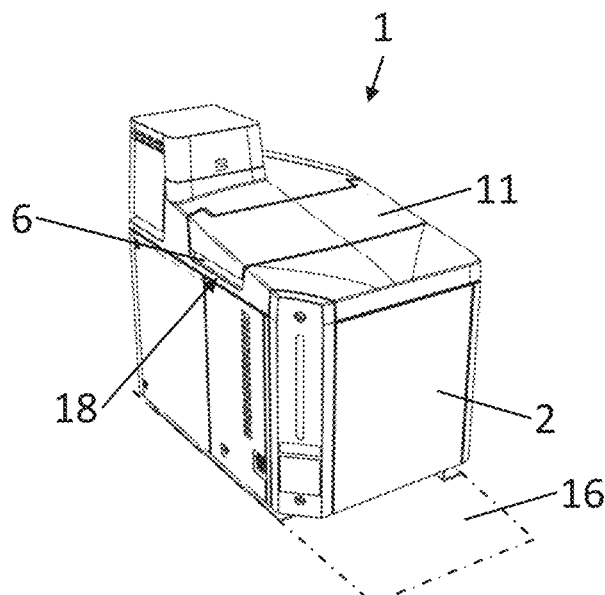
FIG. 1 shows a first embodiment of a melter according to the present invention in a perspective view.

FIGS. 1 to 12 show a first embodiment of a melter 1 according to the invention. The melter 1 is used to prepare a molten adhesive.

The melter 1 has a housing 2 and a melting tank 3, wherein the melting tank 3 is formed within the housing 2 and is surrounded by the housing. The melter 1 has a filling opening 4 for manually introducing the medium to be melted. The medium to be melted can be fed into the melting tank 3 through the filling opening 4, e.g. by means of a small shovel or the like or directly from a storage container. Filling preferably takes place in the direction of the arrow 23 shown in FIG. 16. The melter 1 has a wall section 5 which encircles the filling opening 4, wherein this wall section 5 is in the present case part of a filling hopper 14. This filling hopper 14 is designed as a separate component and in one piece. The filling hopper 14 is fastened in the melter 1 by means of connecting means (not shown specifically), in the present case screws, being screwed to the melting tank 3 or screwed to an inner frame construction of the melter 1, for example. However, it is also conceivable for the wall section 5 to be formed by a sheet-metal structure.

The melter 1 furthermore has an electric heating device (not shown specifically) for heating the melting tank 3 and thus the medium introduced into the melting tank 3. In addition, the melter 1 has a pump for delivering the molten medium to a consumer.

The melter 1 has a one-piece insulating body 6 which encircles the filling opening 4 and covers the wall section 5 of the filling hopper 14. The insulating body 6 is elastically deformable. Specifically, in the present case, the insulating body 6 consists of a silicone elastomer.

Figure 10:
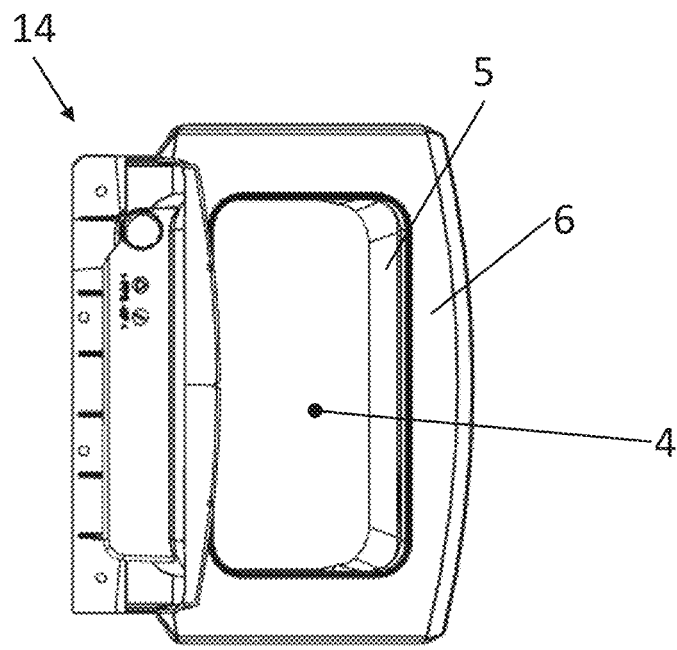
FIG. 10 shows the arrangement according to FIG. 6 in a plan view.
Figure 11:
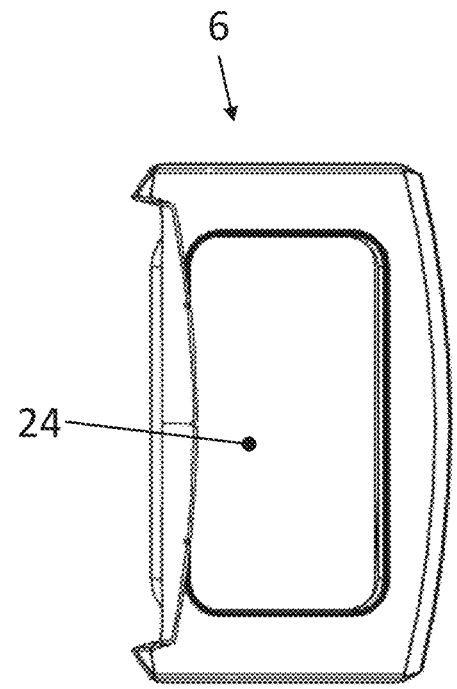
FIG. 11 shows the insulating body according to FIG. 6 in a plan view.
Figure 12:
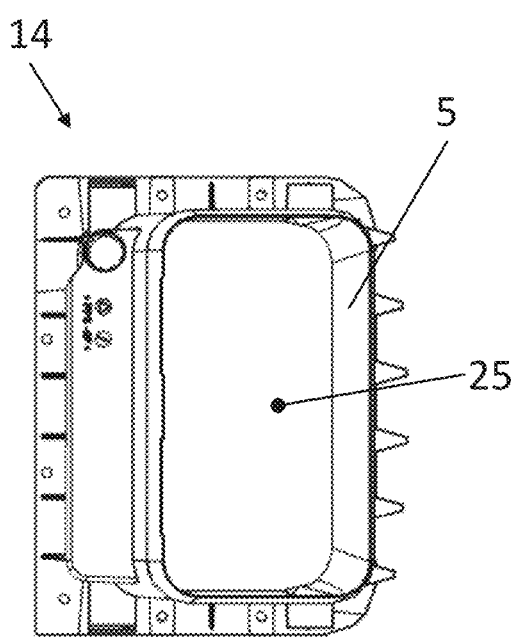
FIG. 12 shows the filling hopper according to FIG. 5 in a plan view.

As can be seen, in particular, from FIGS. 10 to 12, both the filling hopper 14 and the insulating body 6 have an opening 24, 25, wherein the insulating body 6 and the filling hopper 14 are arranged in such a way that the two openings 24, 25 partially overlap one another and in this way form the filling opening 4. In the present case, a partial region of the insulating body 6 having the opening 24 is arranged partially within the opening 25 of the filling hopper 14. Accordingly, the shape of the filling opening 4 in the direction of the arrow 23 is determined first by the shape of the opening 24 of the insulating body 6 and then by the shape of the opening 25 of the filling hopper 14.

In the present case, the insulating body 6 is connected positively to the wall section 5 of the filling hopper 14. For this purpose, the insulating body 6 has a holding structure 7 in the form of a circumferential groove with an undercut, and the wall section 5 has a counter-structure 8 corresponding to the holding structure 7. In the present case, the counter-structure 8 is formed by an outwardly protruding projection which encircles the filling opening 4. In the present case, the insulating body 6 accommodates an end 22 of the wall section 5, which end has the counter-structure 8, in the holding structure 7 designed as a groove.

The melter 1 does not have any additional holding means for fastening the insulating body 6 in the melter 1. Owing to the elastic deformability of the insulating body 6, the insulating body 6 can be connected to the wall section 5 in a simple manner, in particular without tools.

Figure 6:
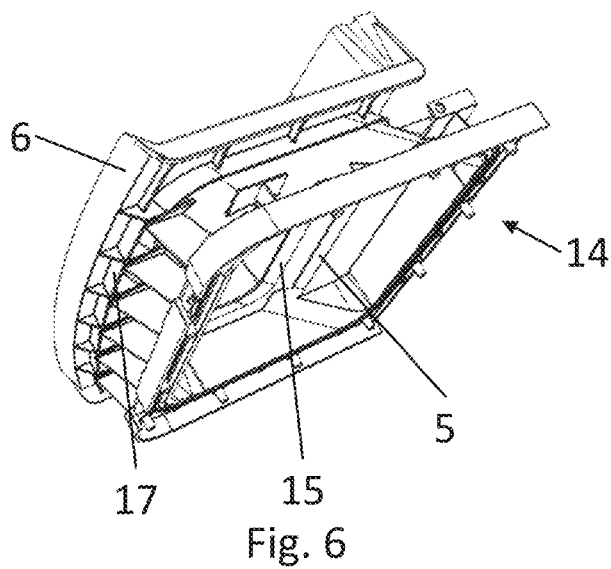
FIG. 6 shows the filling hopper according to FIG. 5 with the insulating body arranged thereon, in a perspective view.
Figure 7:
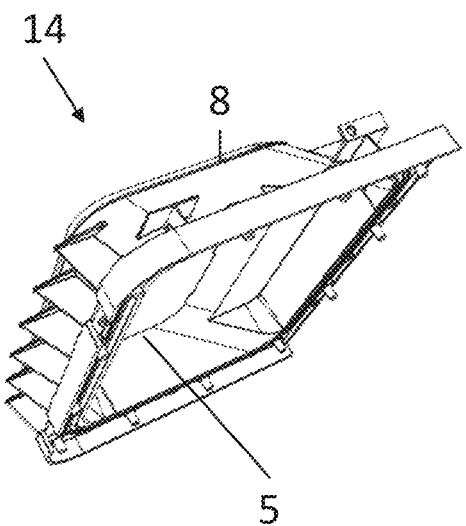
FIG. 7 shows the filling hopper according to FIG. 5 in a view as in FIG. 6.
Figure 8:
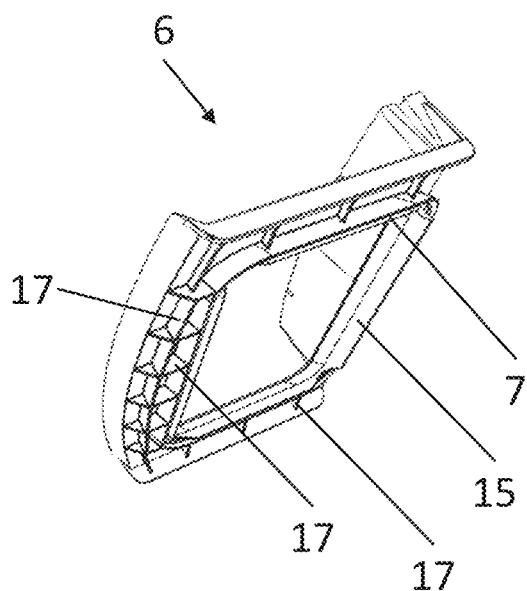
FIG. 8 shows the insulating body according to FIG. 6, in a view as in FIG. 6.
Figure 9:
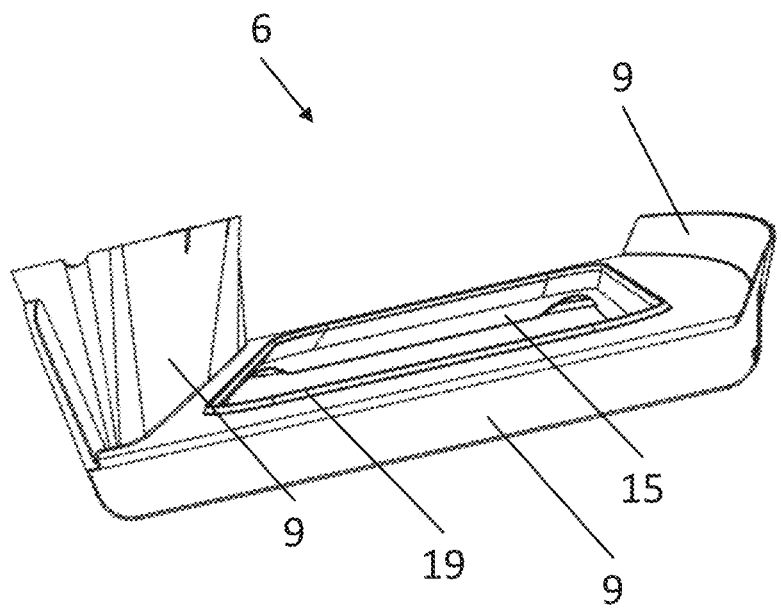
FIG. 9 shows the insulating body according to FIG. 6 in another perspective view.
Figure 16:
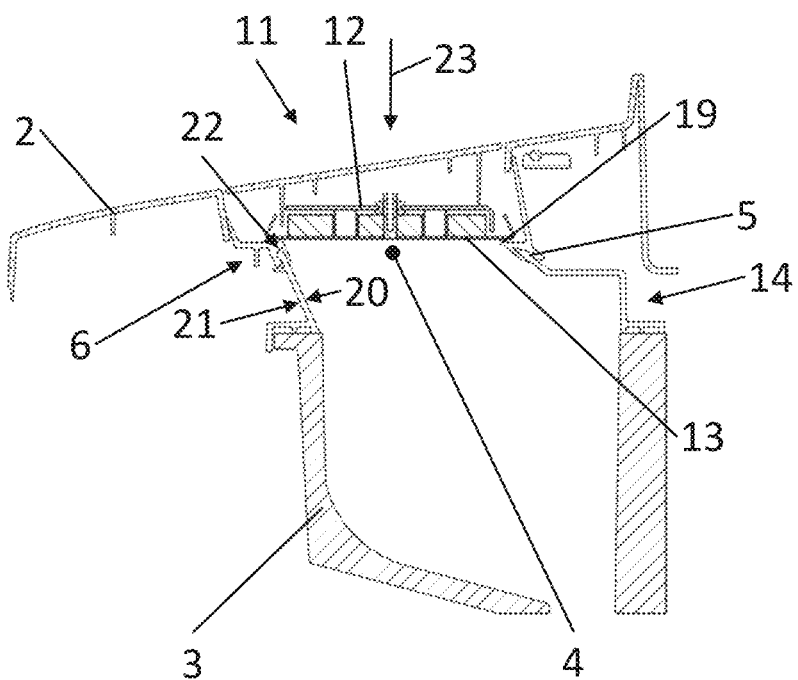
FIG. 16 shows a partial region of the melter in a sectional view with the cover closed.

As can be seen in particular from FIG. 6 and FIG. 16, the insulating body 6 makes direct and flat contact with the wall section 5.

Figure 17:
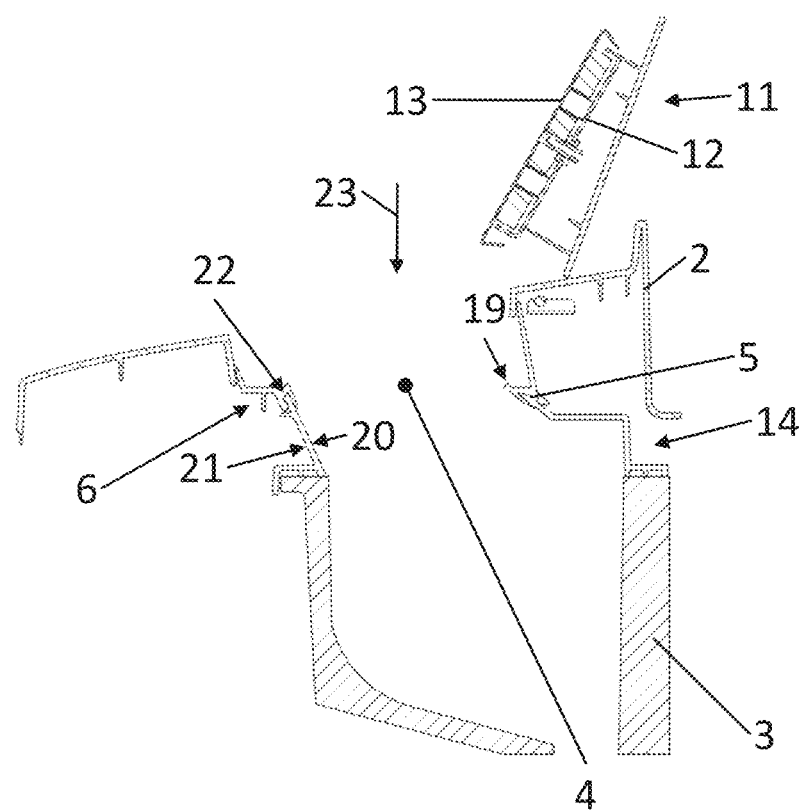
FIG. 17 shows the partial region of the melter according to FIG. 16 in a sectional view with the cover open.

As can be seen, in particular, from FIG. 16 and FIG. 17, the insulating body 6 rests against an inner side 20, facing the filling opening 4, of the wall section 5, against an outer side 21, facing away from the filling opening 4, of the wall section 5, and against the wall section 5 at that end 22 of the wall section 5 which is remote from the melting tank 3. To enable it to rest against the inner side 20 of the wall section 5, the insulating body 6 has an end section 15 which encircles the filling opening 4.

The wall section 5 and the surrounding end section 15 of the insulating body 6 slope relative to a plane 16 formed by the one standing surface of the melter 1.

Figure 2:
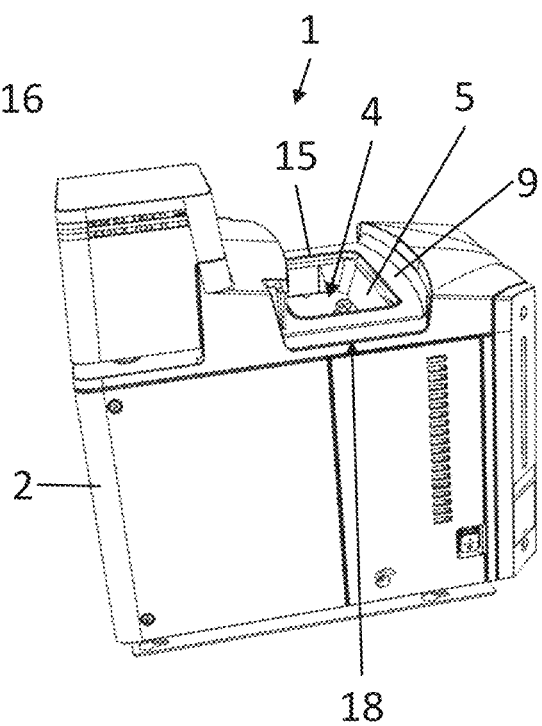
FIG. 2 shows the melter according to FIG. 1 without a cover covering a filling opening, in a perspective view.
Figure 3:
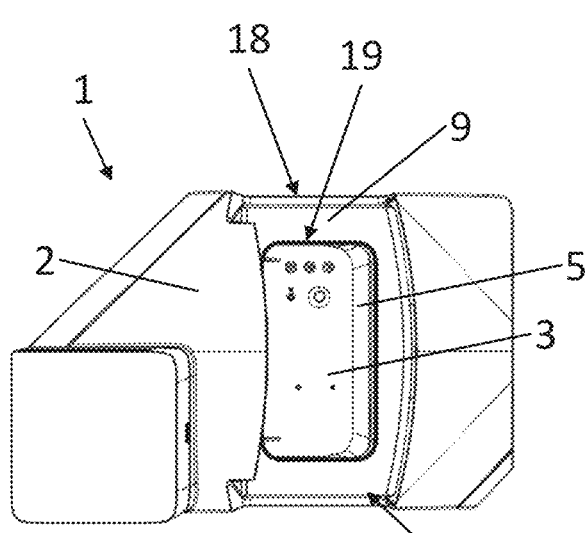
FIG. 3 shows the melter according to FIG. 2 in a plan view.
Figure 4:
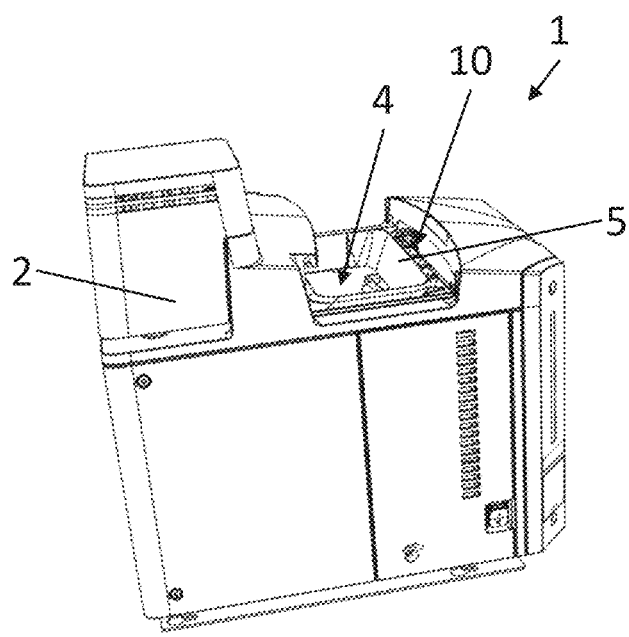
FIG. 4 shows the melter according to FIG. 2 without the insulating body, in a perspective view.
Figure 5:
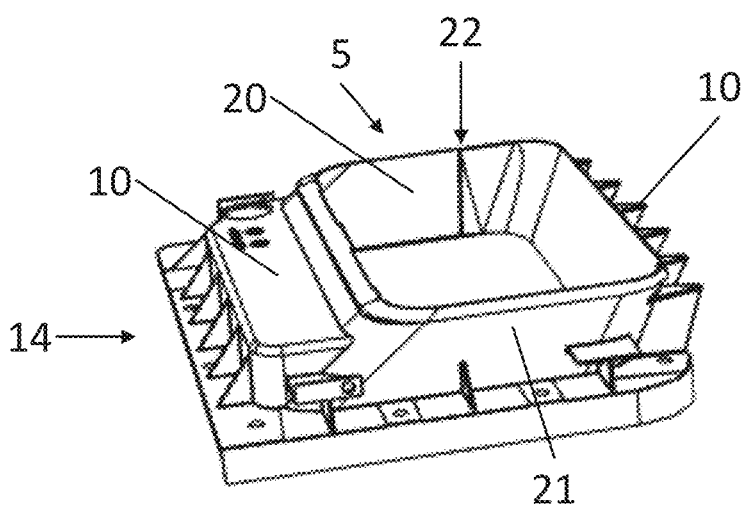
FIG. 5 shows a part of the melter according to FIG. 2, namely a filling hopper, in a perspective view.

As can be seen especially from FIG. 2 and FIG. 3, the insulating body 6 has a covering section 9, wherein the covering section 9 covers a region 10 of the melter 1 which is adjacent to the wall section 5, wherein the covering section 9 makes direct contact with this region 10 in the present case. In the present case, the region 10 is formed substantially by the filling hopper 14 and by recessed grips 18 formed in the region of the housing 2.

In the present case, the melter 1 has a cover 11, mounted pivotably in the housing 2, for closing the filling opening 4. This cover 11 has a main body 12 and a sealing body 13 in the form of a hard plate, which is resiliently mounted in the main body 12. The sealing body 13 forms a sealing surface of the cover 11. For the purpose of tightly closing the filling opening 4, the insulating body 6 likewise has a sealing surface, wherein in the present case the sealing surface is formed by a sealing lip 19 which encircles the filling opening 4 and projects counter to the filling direction and thus in the direction of the closed cover 11. As can be seen, in particular, from FIG. 16 and FIG. 17, the sealing lip 19 is formed radially inward and thus offset to the left in FIG. 16 and FIG. 17 in partial regions, namely on the right in FIG. 16 and FIG. 17, in relation to the encircling end 22. Thus, the insulating body 6 partially covers the opening 25 of the filling hopper 14 in this region.

In an arrangement of the cover 11 in which it closes the filling opening 4, as illustrated in FIG. 1, the sealing surface of the cover 11 makes contact with the sealing surface of the insulating body 6. Because of the elasticity of the sealing lip 19 and the resilient mounting of the sealing body 13 in the main body 12 of the cover 11, a particularly good sealing effect of the cover 11 is achieved since the sealing surfaces can adapt to one another when the cover 11 is closed. It is possible in this way to compensate for part tolerances, and assembly work is simplified and accelerated owing to the omission of adjustment work which is not necessary.

In connection with a cover 11, it is considered expedient if the weight of the cover 11 is selected in such a way that the cover 11 presses with sufficient force on the sealing lip 19 by its own weight. As a result, it is possible to dispense with additional locking means.

The recessed grips 18 formed in the region of the housing 2 facilitate the handling of the cover 11, in particular the opening of the cover 11. As can be seen, in particular, from FIG. 2 and FIG. 1, the insulating body 6 extends into the region of the recessed grips 18.

As can be seen, in particular, from FIG. 3, the externally accessible surface of the insulating body 6 or upper side of the insulating body 6 is substantially smooth and free of corners, edges, undercuts and depressions. As a result, this surface is particularly simple to clean. On its underside, the insulating body 6 has a multiplicity of webs 17. As a result of the webs 17, the insulating body 6 has sufficient dimensional stability despite a low material requirement. In addition, the insulating effect is improved by the webs 17 since the area of contact with the filling hopper 14 is reduced.

Figure 13:
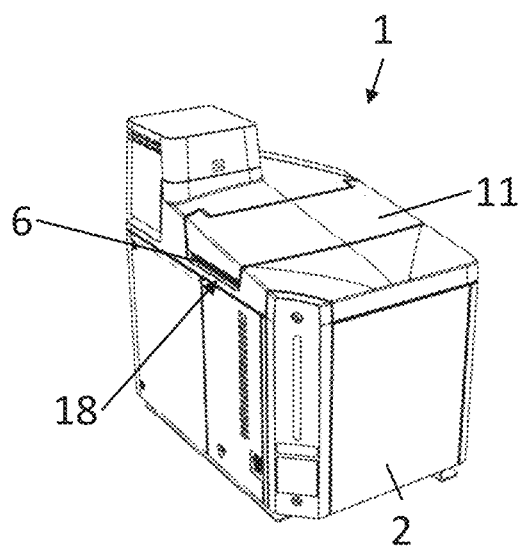
FIG. 13 shows a second embodiment of the melter in a view as in FIG. 1.
Figure 14:
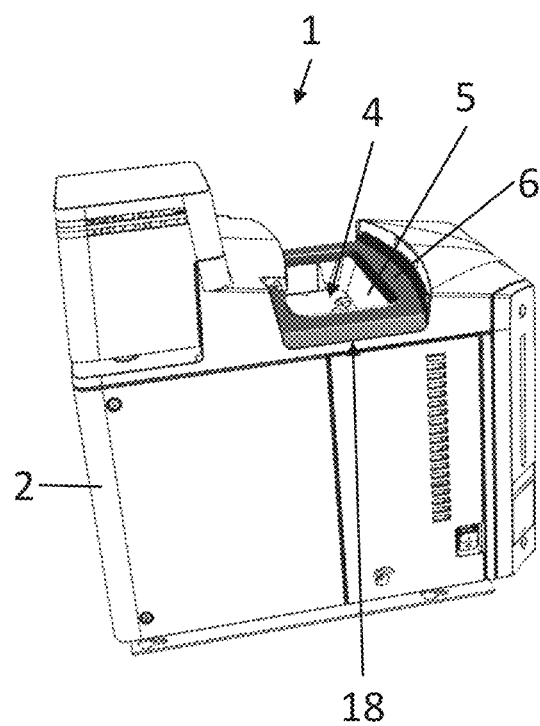
FIG. 14 shows the second embodiment of the melter in a view as in FIG. 2.
Figure 15:
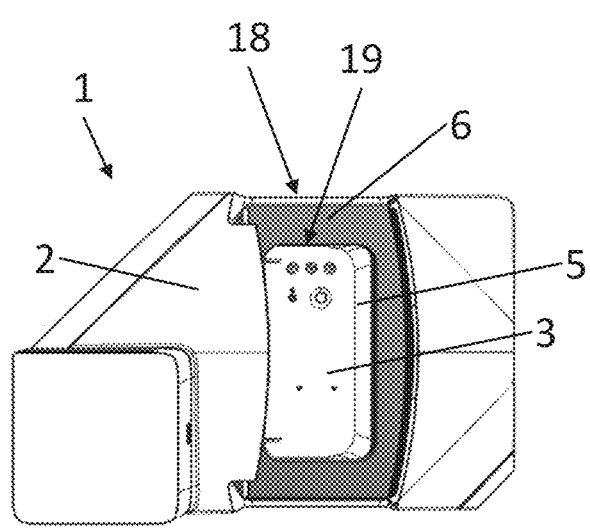
FIG. 15 shows the second embodiment of the melter in a view as in FIG. 3.

FIGS. 13 to 15 show a second embodiment of the melter 1, wherein this second embodiment of the melter 1 differs from the first embodiment of the melter 1 essentially in that the entire insulating body 6 is of single-color configuration and contrasts in color with the wall section 5, the housing 2 and the cover 11. In the present case, the insulating body 6 is colored, namely green, whereas the filling hopper 14 and thus the wall section 5, the housing 2 and the cover 11 are of a light color, in the present case white. As can be seen, in particular, from a comparison of FIGS. 1 to 3 with FIGS. 13 to 15, with such a configuration of the insulating body 6 in color contrast with the other components of the melter 1, it can be determined in a particularly simple manner by a visual check whether the melter 1 is equipped with an insulating body 6 or not.

That which is claimed is:

1. A melter for preparing a molten medium having a housing and a melting tank formed within the housing, wherein the melter further has a filling opening for introducing a medium to be melted, wherein the melter further has a wall section which encircles the filling opening, wherein the melter further has an insulating body which encircles the filling opening and covers the wall section, wherein the insulating body is elastically deformable, and wherein the insulating body has a covering section which covers a region of the melter adjacent to the wall section and/or makes direct contact with the region.

2. The melter according to claim 1, wherein the insulating body comprises an elastomer.

3. The melter according to claim 1, wherein the insulating body makes direct and flat contact with the wall section.

4. The melter according to claim 1, wherein the insulating body interacts non-positively and/or positively with the housing and/or the wall section.

5. The melter according to claim 1, wherein the insulating body has a holding structure and the wall section and/or the housing and/or the melting tank have/has a counter-structure corresponding to the holding structure, and wherein the holding structure and the counter-structure interact positively.

6. The melter according to claim 1, wherein the insulating body is of one-piece design.

7. The melter according to claim 1, wherein the insulating body at least partially covers an inner side of the wall section.

8. The melter according to claim 1, wherein the melter further has a cover for closing the filling opening.

9. The melter according to claim 8, wherein the cover has a first sealing surface and the insulating body has a second sealing surface which projects in the direction of the cover and encircles the filling opening, and wherein, in an arrangement of the cover in which it closes the filling opening, the first sealing surface of the cover makes contact with the second sealing surface of the insulating body.

10. The melter according to claim 9, wherein the cover has a main body and a sealing body which is resiliently mounted and/or movably mounted and/or elastically deformable in the main body, and wherein the sealing body forms the first sealing surface.

11. The melter according to claim 8, wherein the insulating body and at least one of the wall section and the housing and the cover contrast in color.

12. The melter according to claim 8, wherein the insulating body is visible from the outside of the melter when the cover is in a closed position.

13. The melter according to claim 8, wherein the housing and/or the cover have/has recessed grips for handling the cover, and wherein the insulating body extends into a region of the recessed grips.

14. An insulating body for use as the insulating body of the melter according to claim 1.

15. The melter according to claim 1, wherein the insulating body comprises a silicone rubber or a silicone elastomer.

16. A melter for preparing a molten medium having a housing and a melting tank formed within the housing, wherein the melter further has a filling opening for introducing a medium to be melted, wherein the melter further has a wall section which encircles the filling opening, wherein the melter further has an insulating body which encircles the filling opening and covers the wall section, wherein the insulating body is elastically deformable, wherein the melter further has a cover for closing the filling opening, wherein the cover has a first sealing surface and the insulating body has a second sealing surface which projects in the direction of the cover and encircles the filling opening, and wherein, in an arrangement of the cover in which it closes the filling opening, the first sealing surface of the cover makes contact with the second sealing surface of the insulating body.

17. The melter according to claim 16, wherein the cover has a main body and a sealing body which is resiliently mounted and/or movably mounted and/or elastically deformable in the main body, and wherein the sealing body forms the first sealing surface.

18. A melter for preparing a molten medium having a housing and a melting tank formed within the housing, wherein the melter further has a filling opening for introducing a medium to be melted, wherein the melter further has a wall section which encircles the filling opening, wherein the melter further has an insulating body which encircles the filling opening and covers the wall section, wherein the insulating body is elastically deformable, wherein the melter further has a cover for closing the filling opening, and wherein the insulating body is visible from the outside of the melter when the cover is in a closed position.

19. The melter according to claim 18, wherein the housing and/or the cover have/has recessed grips for handling the cover, and wherein the insulating body extends into a region of the recessed grips.

* * * * *